Dec. 27, 1966  G. MATHES  3,294,349
CLAMPING DEVICE
Filed Oct. 22, 1965
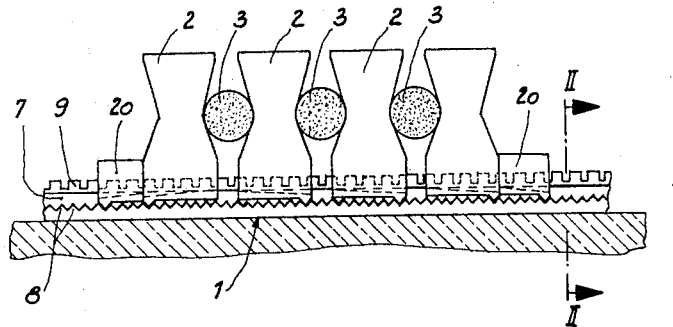
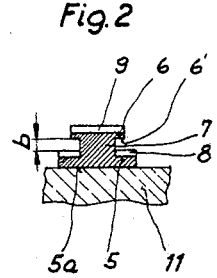
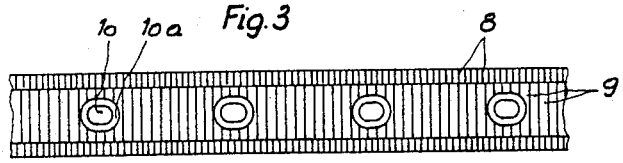
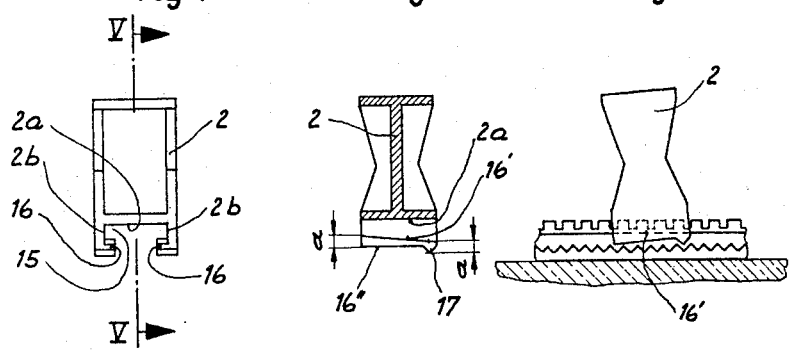
INVENTOR
GUNTHER MATHES
BY
Curtis, Morris + Safford
ATTORNEYS United States Patent Office 3,294,349
Patented Dec. 27, 1966

3,294,349
CLAMPING DEVICE
Gunther Mathes, Vaduz, Liechtenstein, assignor to Anstalt fur Montage-Technik, Vaduz, Liechtenstein
Filed Oct. 22, 1965, Ser. No. 501,776
Claims priority, application Germany, Oct. 26, 1964, A 47,441
7 Claims. (Cl. 248—68)

The present invention relates to a device for clamping and supporting parts, such as cables, pipes and the like, in spaced apart relation on a wall or other supporting surface.

Numerous clamping devices for cables have heretofore been proposed having a plurality of cable clamps that may be pressed against the cables and which, in turn, are connected to a supporting rail. For instance, it is customary to fasten the supporting rail to the wall or other supporting surface by means of nails or screws, and to fasten displaceable cable clamping and supporting elements to the rail by means of set screws. This manner of fastening the clamping elements is very time-consuming due to the time required for inserting and turning the set screws in the clamping elements, on the one hand, and due to the preliminary work which must be done on the clamping elements to mount the cables therebetween, on the other hand, which, as a rule, must be done at the place of mounting.

Furthermore, fastening devices have heretofore been provided for holding cables which consist of a rail and multipartite clamps displaceable on the rail and connected thereto by detent means. The portion of the clamp which is connected with the rail has arms of elastic plastic arranged in an H-shape so that by pressing two arms of the H-clamp together the two other arms separate, and in this way release the clamp so that it can be pushed over corresponding depressions on the rail. Upon release of the first-mentioned H-arms, the second-mentioned arms enter into the detent notches of the rail. This latter type of device, however, does not engage the clamping elements with the sides of a cable with any initial pressure because the force applied to hold the element engaged with the rail is directed perpendicular to the direction of the force serving to hold the cable. Also, the detent notches in the rail must be made relatively large in order to assure a dependable holding of the clamp, so that a fine adjustment of the clamping elements on the rail is not possible. For these reasons, the cables cannot be fastened by the clamping elements alone, but instead, it is necessary to provide arcuate securing members over adjacent clamping elements which have downward directed and beveled end surfaces that press the cable against the rail.

The object of the present invention is to provide an improved fastening device for cables, pipes or the like, which avoids the above disadvantages and uses fewer parts.

Another object is to provide a device of the type indicated which may easily and quickly be operated to clamp the parts in position and automatically lock the clamping element in position when released.

Still another object is to provide a device of the type indicated which is of simple and compact construction, economical to manufacture and one which is reliable in operation.

In accordance with the invention, a rail is provided having a T-shape in cross-section with a central web and flanges projecting laterally from one end of the web. Each clamping element has a corresponding T-shape slot with reentrant flanges underlying the flanges on said rail. Said reentrant flanges have guide surfaces inclined relative to the flanges on the rail to adapt each element to slide longitudinally of the rail and to tilt on the rail about an axis transverse to its longitudinal path of movement. Said rail and clamping elements have interengaging pawl and detent members adapted to slide by each other when moved relative to each other in one direction to engage clamping elements with the parts to be clamped and to interlock with each other by a tilting on the rail when released.

The following advantages result from this construction. The clamping elements can be engaged with the cable or other part to be clamped in position with an initial pressure because the parts of the device itself, such as the rail, is usually made of a plastic material and because the cable or conduit has an inherent elasticity. When a clamping element is pushed into engagement with a part to be clamped its outwardly extending arm engages the part at a location beyond its point of engagement with the rail to produce a force couple on the element to automatically tilt the element and lock it in adjusted position on the rail. The inclined guide surfaces on the element permit such rocking or tilting movement. Such tilting or rocking movement of the element engages the pawl and detent members to lock the element to the rail as well as lock it in engagement with the side of the part to be clamped. Thus, no additional means is required to clamp the cable in position. The construction of the present invention does not require any especially large notches, and correspondingly larger recesses. Instead, a rack on one part with teeth of small pitch provide closely spaced notches which when engaged by a pawl on the other part will provide a firm locking engagement between the parts. Thus, due to the fine spacing of the notches, a practically continuous adjustment of the clamping elements along the rail is possible, and the force couple produced simultaneously presses the clamping element against the part being clamped and rail.

In the illustrated embodiment, the pawl or pawls are formed on and depend from the reentrant flanges of the clamping elements and these flanges together with the opposed sides of the slots provide guide surfaces for elements as they slide along the rail. The depending pawls engage the teeth of the racks arranged on the rail at both sides of the web. The reentrant flanges of the clamping elements are of trapezoidal shape in longitudinal section for close spacing with the outer flanges of the rail at one of their ends and for wider spacing from the flanges at their other end to permit tilting of the elements on the rail. Also, the vertical distance from the inner tip edge of each pawl at the end having the wider slot spacing is substantially equal to the width of the reentrant flange at the end having the narrower slot spacing from the flange on the rail.

With clamping elements having a construction in accordance with the invention, it is possible to push them back and forth as desired on the rail without expanding or otherwise changing the relationship of the parts. The rail can be provided in advance with the required number of clamping elements which need only be pushed into pressing engagement with the part to be clamped. It has been shown that the laying of cables with the clamping device of the present invention is approximately four times faster than laying the cables in the type of prior art devices previously described.

It has been found particularly advantageous to have the clamping elements brought in pressing engagment with the part to be clamped by means of a tool which exerts a lever-like force on the bottom of the elements. For this purpose, the outer side of each rail flange is provided with another series of notches formed between the teeth of a rack. The distance between the upper edge of the rack and the bottom of the T-shape groove in the clamping elements is sufficient to insert a screw-driver into a notch between adjacent teeth and below the clamping element so that a prying force can be transferred to the clamp element to advance it along the rail. When the screwdriver is inserted, the pawls at the ends of the reentrant flanges of the clamping element are raised out of engagement with the rack teeth acting as holding detents whereupon the clamping element is pressed against the cable with a slight compression of the elastic cable element and deformation of the element. The resistance of the clamping element to further advance then rocks it and the depending pawls between two rack teeth to lock the element in said adjusted position on the rail.

The invention will now be described with reference to the drawings, given by way of example, in which:

FIGURE 1 is a side elevation of a clamping device in accordance with the invention;

FIGURE 2 is a section along the line II—II of FIGURE 1;

FIGURE 3 is a top plan view of the rail of the device of FIGURE 1;

FIGURE 4 is an end elevation of a clamping element for the device as shown in FIGURE 1;

FIGURE 5 is a sectional view taken along the line V—V of FIGURE 4;

FIGURE 6 shows the position of the clamping element during movement along the rail of the device;

FIGURE 7 shows the position of a clamping element while it is being pried against a cable by means of a lever tool; and FIGURE 8 shows the device when used for mounting an individual cable.

As shown in FIGURE 1, the clamping device comprises clamping elements 2 mounted on a rail 1 and clamping one or a plurality of cables or pipes 3 therebetween. FIGURE 2 shows that the rail 1 has the profile of a double-T with the lower flanges 5 and the upper flanges 6 projecting laterally from the opposite ends of a web 7. The bottom 5a of the rail 1 rests on a supporting wall and has teeth 8 arranged in the manner of a rack on the top of the lower flanges 5 at opposite sides of the web 7. The teeth 8 are preferably formed as symmetrical V-shape in cross-section. The upper flange 6 also is provided with teeth 9 on the outer side thereof which are rectangular in cross-section, as can be observed in FIGURE 2. As can be further observed in FIGURE 3, the rail 1 has boreholes 10 spaced apart from each other and countersunk at 10a which serve to fasten the rail to the wall 11.

FIGURES 4 and 5 illustrate a clamping element 2 as provided with side walls, a transverse wall 2a between the side walls and reentrant flanges 16 extending inwardly from the bottom edges of the side walls to provide a T-shape slot 15 corresponding to the shape of the T-shape rail 1. The reentrant flanges 16 have guide surfaces 16' inclined with respect to the transverse wall 2a to provide wedge-shaped guideways at opposite sides of the clamping element which cooperate with the flanges 6 on the rail to permit relative sliding and tilting movement thereon. As can be observed in FIGURE 5 a downwardly directed tooth-shaped pawl 17 is provided on the end of each reentrant flange 16 having the widest spacing from the transverse wall 2a. Thus, the pawls 17 overlie the teeth 8 of the racks on the flanges 5 for engagement therewith when the element is rocked on the rail. Furthermore, it can be observed from FIGURE 5 that the reentrant flange 16 is of trapezoidal shape in longitudinal section and that the vertical distance a from the apex of the tooth to the inner edge 16' of the flange 16 is equal to the distance a from the edge 16'' of the flange to the edge 16' at the end of the flange opposite the end having the pawl. In other words, the inner edge 16' of the reentrant flange 16 does not extend parallel to the wall 2a of the T-slot 15, but instead, is inclined at an angle to it. A comparison of the clamping element 2 with the rail 1 shown in profile in FIGURE 2 shows that the distance a, see FIGURE 5, is equal to or only slightly less than the distance b between the apex of the rack teeth 8 on a flange 5 of the rail 1 and the lower edge 6' of a flange 6 of the rail 1. As a result of the dimensions of the slot 15 in the clamping element 2 and rail 1 as described, it is possible to slide the clamping element freely along the rail, although the height of the slot 15 opposite the pawl 17 is equal to the space between the flanges 5 and 6 of the profiled rail, whereby to assure a locking engagement with the detent teeth on the rail 1 when rocked to an upright position. FIGURE 6 illustrates the inclined position of the clamping element 2 on the rail 1 during free sliding movement along the rail which corresponds to the inclination of the guide surface 16' of the guide slot 15, while FIGURE 1 shows the clamping element in engaged vertical position on the rail 1.

It will be understood, however, that it is not necessary in all cases to mount the pawl and detent means on the clamping element 2 and rail 1 in the manner described in the illustrated embodiment. For example, the pawl 17 on the clamping element 2 can also be located on the wall 2a of the T-slot 15 and the cooperating detent teeth can be located on the upper flange 6 instead of on the flange 5. Other embodiments of clamping elements 2 and rails 1 employing the invention with which the above-mentioned advantages can be obtained are also possible.

The manner of clamping of a cable 3 between two clamping elements is now described. First of all one of the clamping elements is held in a vertical position to engage its pawls 17 with the detent teeth 8 on the rail 1, and the cable 3 is pressed against the side of the clamp which is opposite the pawl 17. Another clamping element 2 is then pushed against the cable 3 in such a manner that the pawl 17 on this element is located at the end opposite the cable. The second clamping element is pressed by hand against the cable 3 and thereupon, as shown in FIGURE 7, a suitable tool, preferably a screwdriver, may be placed between the edge 2a of the element and two teeth 9 on the upper flange of the rail 1 to exert a lever action on the element and pry it forwardly by swinging the screwdriver relative to the rail.

Upon rocking movement of the screwdriver, the clamping element or its pawl 17 is first of all lifted out of the rack teeth 8 and then pried forwardly in the direction of the cable. The engagement of the clamping element with the cable 3 produced a reactive force to automatically tilt the element to engage the pawl 17 with a detent tooth 8. It can be observed that the force with which the clamping element 2 is engaged with the cable 3 will hold the pawl of the clamping element 2 engaged with a detent tooth 8 on the rail 1.

In order then to loosen the clamps, their upper ends are pressed together, as a result of which the pawls 17 can be lifted out of the rack teeth 8. To prevent the cable from being loosened by unintentional pressing together of the upper ends of the clamp, securing members 20, as shown in FIGURE 1, may be mounted on the rail 1 against both ends of a row of clamping elements 2. The securing members 20 have the same T-slot as each clamping element 2, and are provided with the same detent teeth and guide surfaces as a clamping element.

While a single embodiment of the invention is herein illustrated and described, it will be understood that changes may be made in the construction and arrangement of the elements without departing from the spirit or scope of the invention. Therefore, without limitation in this respect the invention is defined by the following claims.

What is claimed is:

1. A device for clamping one or more parts in spaced relation comprising, a rail adapted to be attached to a supporting surface, a plurality of clamping elements mounted to slide along said rail and engage the parts to be clamped therebetween, said rail being of a T-shape form in cross section with a central web and flanges projecting laterally from the web, each of said clamping elements having reentrant flanges underlying the flanges on the rail and forming a T-shaped slot corresponding to the shape of the rail, said slot in each of said clamping elements having dimensions relative to the flanges on the rail to adapt the plurality of elements to slide longitudinally of the rails and tilt on the rail about an axis transverse to its longitudinal path of movement, said rail and said plurality of clamping elements having interengaging pawl and detent members adapted to slide by each other when moved relative to each other in one direction to press the clamping elements against the parts to be clamped and to engage each other by tilting movement of the elements, and means for sliding each clamping element along the rail into tight engagement with a part to be clamped, successively, whereby to clamp a plurality of parts on the same rail.

2. A device in accordance with claim 1 in which the detent member is in the form of a rack on said rail and having spaced teeth arranged longitudinally thereof and the pawl on each clamping element overlies the rack, the slot in each clamping element formed by said reentrant flanges having opposed guide surfaces inclined relative to each other longitudinally of the element to permit tilting movement of the element relative to the rail to release the pawl from engagement with the rack, and said pawl depending from the clamping element at the end of the guide surface at the widest end of the slot.

3. A device in accordance with claim 1 in which the detent member is in the form of a rack on said rail and having spaced teeth arranged longitudinally thereof and the pawl being located on the clamping element, the reentrant flanges of each clamping element forming guide surfaces underlying the flanges on the rail, said reentrant flanges being of a trapezoidal shape and inclined with respect to the flange of the rail, the pawl depending from the end of the guide surface of the reentrant flange at the widest end of the slot and projecting from the clamping element a distance substantially equal to the width of the reentrant flange at the opposite end of the element.

4. A device in accordance with claim 1 in which the rail has a base formed by flanges projecting laterally from the web below the flanges at the outer T-shape end of the web, the detent member being a rack having spaced teeth on the base flange, said teeth being V-shaped in cross section, and said pawl depending from the reentrant flange for engagement with the rack teeth.

5. A device in accordance with claim 2 in which the outer surface of the rail formed by the laterally projecting flanges is notched to form spaced teeth, the inclined guide surfaces on each clamping element permitting the element to tilt outwardly relative to the rail and be cammed longitudinally along the rail by a lever engaged with the teeth on the rail, and said clamping element tilting on the rail upon engagement with the part to be clamped to engage the pawl and a detent tooth on the rack.

6. A device in accordance with claim 5 in which the spaced teeth on the outer surface of the rail are of rectangular shape in cross section.

7. A device in accordance with claim 1 in which at least two of the clamping elements are mounted on the rail in reverse relationship to clamp a part therebetween whereby the reaction force tends to tilt each clamping element away from the part to engage its pawl with a detent.

References Cited by the Examiner

UNITED STATES PATENTS

| 514,614 | 2/1894 | Brintnall | 269—171 |
| 2,413,744 | 1/1947 | Carter | 280—179 |

FOREIGN PATENTS

| 681,913 | 10/1939 | Germany. |
| 41,791 | 1/1939 | Netherlands. |
| 87,360 | 9/1936 | Sweden. |

CLAUDE A. LEROY, *Primary Examiner.*